(12) United States Patent
Burek et al.

(10) Patent No.: US 6,421,493 B1
(45) Date of Patent: Jul. 16, 2002

(54) APPARATUS AND METHOD FOR ASSEMBLING AND ALIGNING A PLURALITY OF OPTICAL FIBERS

(75) Inventors: Denis E Burek, Cumming; Muhammed A Shahid, Snellville; Brandon J West, Roswell, all of GA (US)

(73) Assignee: Fitel USA Corp.

( * ) Notice: Subject to any disclaimer, the term of this patent is extended or adjusted under 35 U.S.C. 154(b) by 0 days.

(21) Appl. No.: 09/585,813

(22) Filed: Mar. 24, 2000

(51) Int. Cl.[7] ................................................. G02B 6/00
(52) U.S. Cl. ........................................ 385/134; 385/137
(58) Field of Search ................................. 385/134, 137, 385/136, 147, 60, 65, 59, 54, 71, 72, 83, 139

(56) References Cited

U.S. PATENT DOCUMENTS

| | | | | |
|---|---|---|---|---|
| 4,252,407 A | * | 2/1981 | Bubanko et al. | 385/59 |
| 5,471,555 A | * | 11/1995 | Braga et al. | 385/136 |
| 5,754,725 A | * | 5/1998 | Kuder et al. | 385/145 |
| 5,812,726 A | * | 9/1998 | Jinnai et al. | 385/137 |
| 6,072,932 A | * | 6/2000 | Bennett et al. | 385/139 |

\* cited by examiner

Primary Examiner—Hemang Sanghavi
Assistant Examiner—Scott A Knauss
(74) Attorney, Agent, or Firm—John M. Harman (57) ABSTRACT

Embodiments of the invention include an optical uniform spacing assembly for aligning a multipitch plurality of optical fibers into a uniform pitch linear array of optical fibers. The assembly includes an organizer body having a slot formed therein that extends longitudinally along the body. A portion of the slot has a width dimensioned to allow only one optical fiber at a time therethrough simultaneously and a depth dimensioned to align a multipitch plurality of optical fibers into a uniform pitch linear array of optical fibers. The assembly provides sufficient alignment for transitioning from, e.g., an optical fan-out arrangement such as a plurality of individual optical fibers to, e.g., an optical fan-in arrangement such as a ribbon cable arrangement. The assembly provides a compact, easily assembled apparatus and method for overcoming size mismatch and other conventional problems associated with transitioning between differing arrangements. Alternatively, the spacing assembly includes a transition assembly coupled to the front end thereof for providing additional alignment to, e.g., a multipitch array of optical fibers, prior to their alignment within the organizer body. Also, alternatively, an optical device such as a multifiber optical connector is coupled to the back end of the spacing assembly. Suitable multifiber connectors include, e.g., a MT connector, a MAC connector, or a LMC connector.

21 Claims, 11 Drawing Sheets

APPARATUS AND METHOD FOR ASSEMBLING AND ALIGNING A PLURALITY OF OPTICAL FIBERS

BACKGROUND OF THE INVENTION

1. Field of the Invention

The invention relates to assembly and alignment of multiple optical fibers. More particularly, the invention relates to assembly apparatus and methods for aligning optical fibers for connectorization.

2. Description of the Related Art

The explosive growth in demand for capacity in communications networks including data networks has spawned an increase in the number of optical fibers within optical fiber cables and in the attendant interconnections between the optical fiber cables and the network nodes. Also, the increasing use of optical fibers for shorter-haul distances has further prompted a need for optical cables with larger fiber counts. Such short-haul uses include local loop applications and delivery of communication services to homes and offices. Because of these increased demands placed on optical fiber communication systems, the organization and alignment of optical fibers, e.g., for interconnection between various optical devices, has become more important to the overall performance of the optical system.

Typically, optical fibers are organized into ribbon cables or other arrangements having highly precise, fixed spatial relationships. An optical fiber ribbon or ribbon cable includes a plurality of optical fibers that extend longitudinally and are laterally adjacent and bound together laterally by a matrix material as a single, linear array of optical fibers. Optical fiber ribbon cables typically are connected to other optical devices such as optical transmitters, receivers or other optical fibers through one or more optical connectors.

Optical fiber ribbon connectors typically include a metal or silicon body having an array of grooves dimensioned to position the ends of the individual optical fibers within the ribbon cable. More recently, such connectors have been made of plastic. Typically, the individual fibers are stripped of their protective coating and secured side by side in the connector grooves. The fibers ends then are cleaved and polished to form a smooth surface with the connector endface. The ribbon cable typically is connected to other optical devices by butt-splicing the connector endface to a similar surface of the other optical device. In this manner, the use of ribbon fiber for multi-fiber interconnection simplifies the connection arrangements, provides fiber strength and stability and improves the consistency of the spacing between adjacent fibers.

However, in applications where the optical fibers to be interconnected have different arrangements or are sized differently, conventional interconnection devices and methods are insufficient. For example, in optical fan-in/fan-out arrangements, the fan-in side typically is characterized by uniform spacing between one or more linear arrays of optical connections, e.g., a ribbon fiber arrangement. In contrast, the fan-out side typically is characterized by a plurality of multi-pitched fibers that often are of varying size or are sized differently than the fibers of the fan-in side, which often are sized and spaced in accordance with conventional, commercial connectors. Quite often, the fan-out side has a plurality of individual optical fibers connected thereto. Thus, interconnection between the two disparate arrangements requires an effective alignment transition therebetween.

Accordingly, it would be desirable to have available interconnection apparatus and/or methods for transitioning between different optical fiber arrangements. In this manner, optical fiber arrangements such as optical ribbon cables are suitable for connection to optical devices such as optical transmitters, optical receivers or are interconnected to other optical fibers, regardless of whether such fibers are in the form of other ribbon cables or multipitch, multi-fiber arrangements typical of, e.g., fan-out configurations.

SUMMARY OF THE INVENTION

The invention is embodied in an optical uniform spacing assembly for aligning a multipitch plurality of optical fibers into a uniform pitch linear array of optical fibers. The optical uniform spacing assembly includes an organizer body having a slot formed therein that extends longitudinally along the body. A portion of the slot has a width dimensioned to allow only one optical fiber at a time therethrough simultaneously and a depth dimensioned to align a multipitch plurality of optical fibers into a uniform pitch linear array. That is, a portion of the slot has a width only slightly larger than the diameter of an optical fiber and a depth that is only slightly larger than the width of a uniform linear array of optical fibers.

The spacing assembly provides sufficient alignment for transitioning from, e.g., an optical fan-out arrangement such as a plurality of individual optical fibers to, e.g., an optical fan-in arrangement such as a ribbon cable arrangement. The spacing assembly provides a compact, easily assembled apparatus and method for overcoming size mismatch and other conventional problems associated with transitioning between differing arrangements.

Alternatively, the spacing assembly includes a transition assembly coupled to the front or fan-out end of the organizer for providing additional alignment to, e.g., a multipitch array of optical fibers, prior to their alignment within the organizer body. Also, alternatively, an optical device such as a multi-fiber optical connector is coupled to the back or fan-in end of the organizer body. Suitable multifiber connectors include, e.g., a MT connector, a MAC connector, or a LMC connector.

BRIEF DESCRIPTION OF THE DRAWINGS

In the drawings:

FIG. 2b is a perspective view of the back end or the fan-in end of the primary assembly body shown in FIG. 2a;

FIG. 3b is a back perspective view of the two-piece transition assembly piece shown in FIG. 3a;

FIG. 5b is a back perspective view of the transition assembly portion shown in FIG. 5a;

FIG. 6a is a cross-sectional view of the transition assembly taken along the lines 6a—6a of FIG. 5a;

DETAILED DESCRIPTION

In the following description similar components are referred to by the same reference numeral in order to simplify any sequential aspect of the drawings and to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Figure 1A:
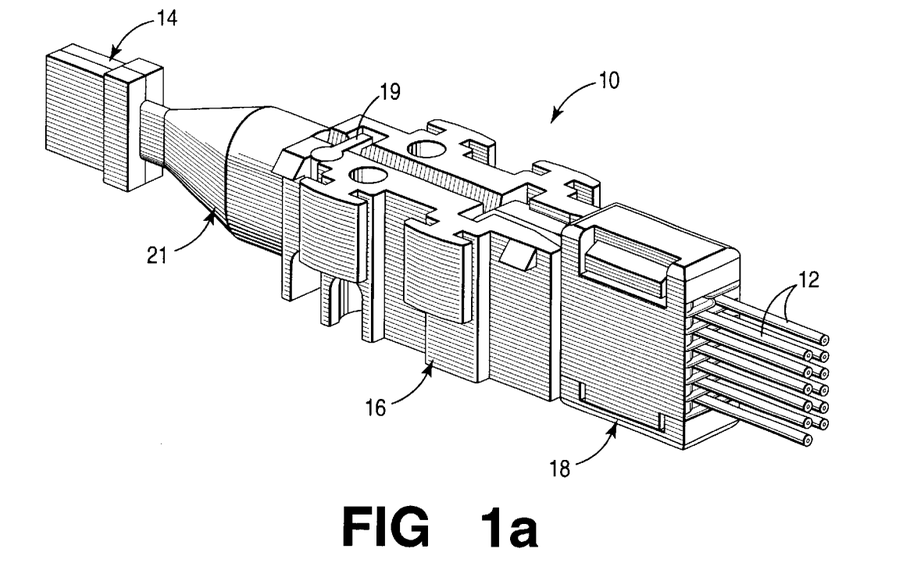
FIG. 1a is a perspective view of an optical fiber uniform spacing assembly according to an embodiment of the invention coupled to a transition assembly and coupled to a multifiber connector.
Figure 1B:
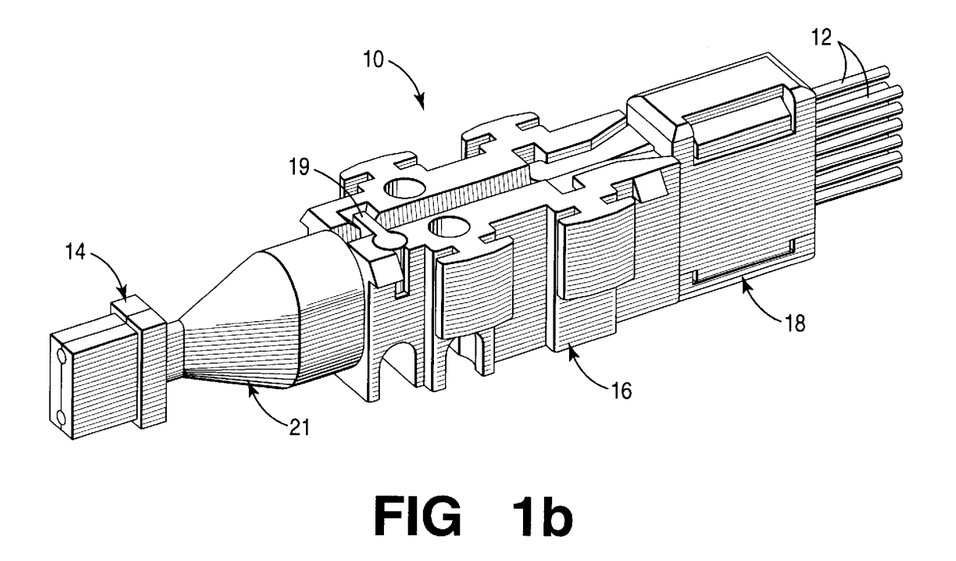
FIG. 1b another perspective view of an optical fiber uniform spacing assembly shown in FIG. 1a coupled to a transition assembly and coupled to a multifiber connector.

Referring now to FIGS. 1a–b, shown are perspective views of an optical fiber uniform spacing assembly 10 according to an embodiment of the invention. The spacing assembly 10 positions and aligns a first optical device 12 such as a multipitch plurality of optical fibers into a linear array of uniformly pitched optical fibers suitable for efficient coupling to a second optical device 14 such as a multifiber connector having a uniform pitch linear array or optical waveguides (e.g., a ribbon fiber connector). As will be evident from the discussion hereinbelow, the spacing assembly 10 provides a compact, easily assembled apparatus and method for overcoming size mismatch and other conventional problems associated with transitioning between differing arrangements.

For purposes of discussion in this description, the term "pitch" is intended to denote the center-to-center spacing between adjacent optical fibers, e.g., optical fibers within a linear array of optical fibers typically referred to as a ribbon, ribbon cable, optical ribbon cable or optical fiber ribbon cable. Also, for purposes of discussion in this description, "multipitch" refers to the variable center-to-center spacing between, e.g., adjacent optical fibers within a plurality of optical fibers. For example, a multipitch plurality of optical fibers includes a plurality of loose, individual optical fibers or a set of pre-connectorized single ended cables. Also, a multipitch plurality of optical fibers includes, e.g., a fan-out arrangement of optical fibers.

Uniform pitch linear array devices include, e.g., optical fiber ribbon arrays and ribbon fiber connectors such as the connector 14 shown. Ribbon arrays and ribbon fiber connectors typically have an established center-to-center spacing between adjacent optical fibers and/or waveguides (e.g., 250 $\mu$m). The multipitch plurality of optical fibers 12 shown is, e.g., a plurality of individual or duplex optical fibers connected to or coming from a fan-out arrangement. Single or duplex cables often come in sizes much different (e.g., larger) than the fibers in ribbon arrays. Thus, a transition region often is useful in optically connecting and transitioning from one size to the other.

The spacing assembly 10 includes a primary assembly body or organizer 16, a transition assembly 18 and a holddown 19. As will be discussed in greater detail hereinbelow, the transition assembly 18 typically is a one-piece or two-piece assembly that provides strain relief to and generally aligns a multipitch plurality of optical fibers positioned therein. The transition assembly 18 fits in or operably couples to the organizer 16 at one or more locations along the body of the organizer 16. The holddown 19 maintains alignment of the fibers in the organizer 16. The second optical device 14 is coupled to the organizer 16, e.g., via a coupling tube 21 or other suitable coupling arrangement.

Figure 2A:
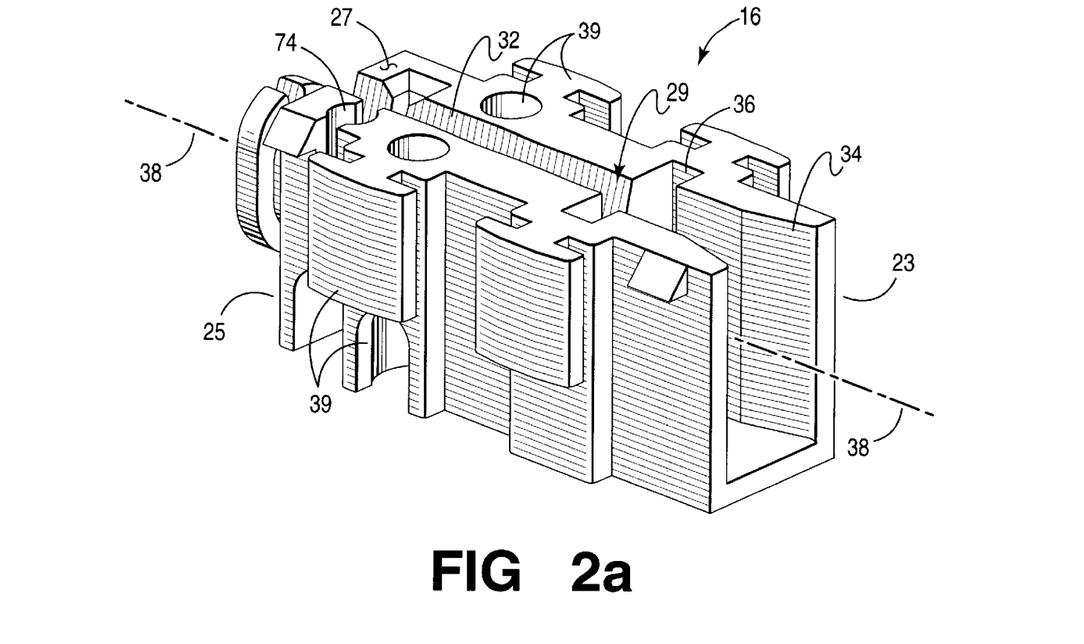
FIG. 2a is a perspective view of the front end or the fan-out end of the primary assembly body portion of the optical fiber uniform spacing assembly according to an embodiment of the invention.
Figure 2B:
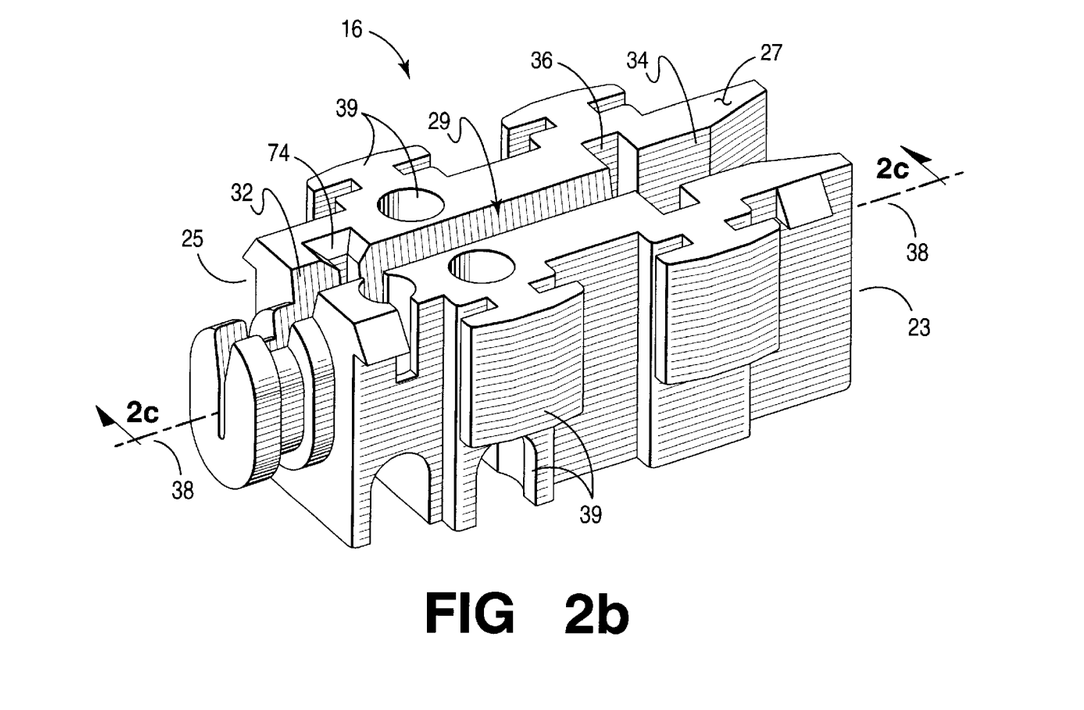

Referring now to FIGS. 2a–b, the organizer 16 is shown. FIG. 2a shows a perspective view of the organizer 16 from a front end 23, which also is referred to herein as the fan-out end or the multipitched optical fiber end. FIG. 2b shows a perspective view of the organizer 16 from a back end 25, which also is referred to herein as the fan-in end or the uniformly aligned optical fiber end. The organizer 16 has a top surface 27 with a slot 29 formed therein that runs along the length of the organizer 16. The slot has a first portion 32 that begins at the back end 25 of the organizer 16 and runs toward the front end 23, and a second portion 34 integral therewith that runs to the front end 23 of the organizer 16.

According to embodiments of the invention, the first portion 32 of the slot 29 on the organizer 16 is dimensioned to align a plurality of optical fibers into a uniform pitch linear array of optical fibers. That is, the first portion 32 of the slot 29 has a width that is only slightly larger than the diameter of a polymer coated optical fiber and a depth that is only slightly larger than the width of a uniform linear array of coated optical fibers. For example, for a linear array of 12 optical fibers, each having a diameter of approximately 250 microns ($\mu$m) when stripped of their protective jackets (including strength members), the first portion 32 of the slot 29 is approximately 250 $\mu$m wide and approximately 3 millimeters (mm) deep (12×250 $\mu$m). As will be understood to those skilled in the art, in practice, the actual dimensions of the first portion 32 of the slot 29 are just slightly larger than the given values to allow the optical fibers enough room to move into their aligned locations.

Figure 2C:
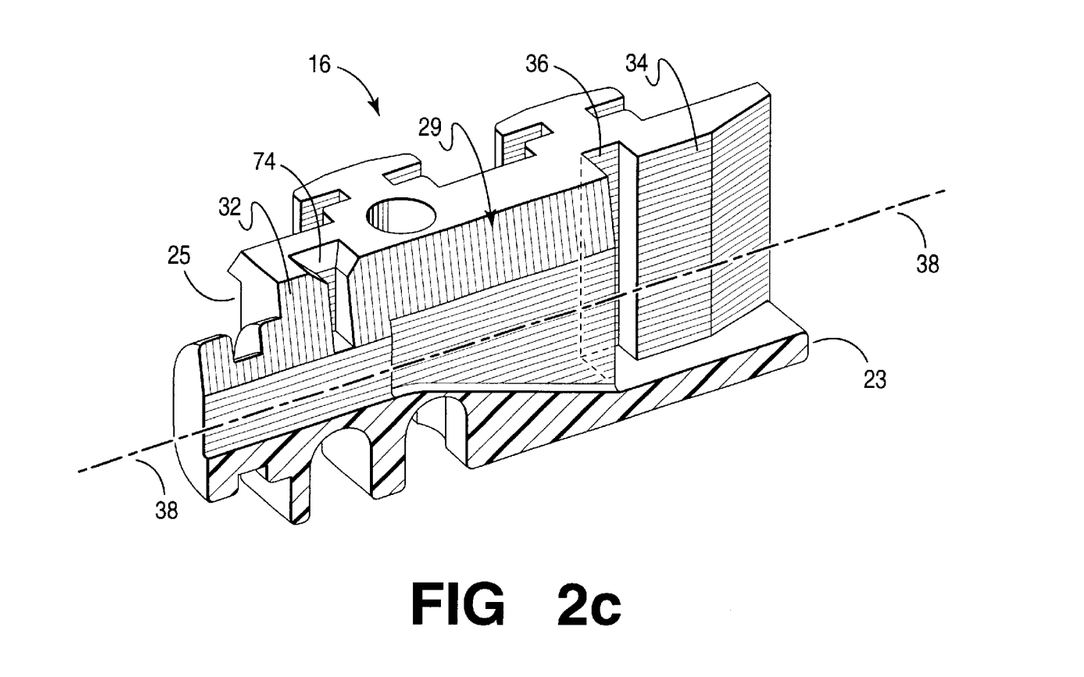
FIG. 2c is a cross-sectional view of the primary assembly body shown in FIGS. 2a–b taken along the lines 2c—2c of FIG. 2b.

As the slot 29 runs toward the front end 23 of the organizer 16, the first portion 32 of the slot 29 becomes the second portion 34 of the slot 29, and thus widens and deepens to dimensions suitable to accommodate coupling of the transition assembly 18 thereto. See, e.g., FIG. 2c. The change in depth of the second portion 34 of the slot 29 is seen, e.g., by observing the depth of the slot 29 at the back end 25 or the organizer 16 (FIG. 2b) compared to the depth of the opening of the slot at the front end 23 of the organizer 16 (FIG. 2a). Coupling of the transition assembly 18 to the organizer 16 is discussed in greater detail hereinbelow.

According to an embodiment of the invention, the second portion 34 of the slot 29 has one or more sets of flanged indentations 36 formed therein configured transverse to the longitudinal axis 38 of the slot 29 to accommodate the transition assembly 18. However, suitable coupling arrangements other than the flange indentations 36 are possible and should be apparent to those skilled in the art.

As will be more apparent from discussions hereinbelow, the organizer 16 holds and stabilizes the transition assembly 18 while providing further alignment of the optical fibers exiting the transition assembly 18. Also, the organizer 16 provides a protective, organized space for the aligned fibers prior to their emergence from the back end 25 of the organizer 16. Other functions of the organizer 16 will be apparent to those skilled in the art from further discussions hereinbelow. For example, organizer 16 is configured with one or more features (shown generally as 39) useful in aligning and/or securing the organizer 16 to other devices within a communications system in which the optical fiber uniform spacing assembly 10 is used.

The transition assembly 18 (referring back to FIGS. 1a–b) is a two-piece or one-piece assembly configured to fit in or otherwise operably couple to the organizer 16, e.g., at its front end 23. The transition assembly 18 positions and generally aligns a plurality of optical fibers including a multipitch plurality of optical fibers. The transition assembly 18 positions the optical fibers therein in such a way that the transition assembly 18 provides strain relief to the fibers. The strain relief provided allows the optical fibers to be more readily aligned, e.g., within the organizer 16.

Although the transition assembly 18 is shown further and discussed hereinbelow as being formed by intermating two housing members of the type shown, e.g., in FIGS. 3a–b, it is within the scope of embodiment of the invention to have a transition assembly made of a single piece, or even more than two pieces. Such alternative embodiments would be apparent to one skilled in the art. For single-piece transition assemblies, the plurality of optical fibers are inserted therethrough rather than positioned within individual housing members that subsequently are intermated to form the transition assembly 18.

Figure 3A:
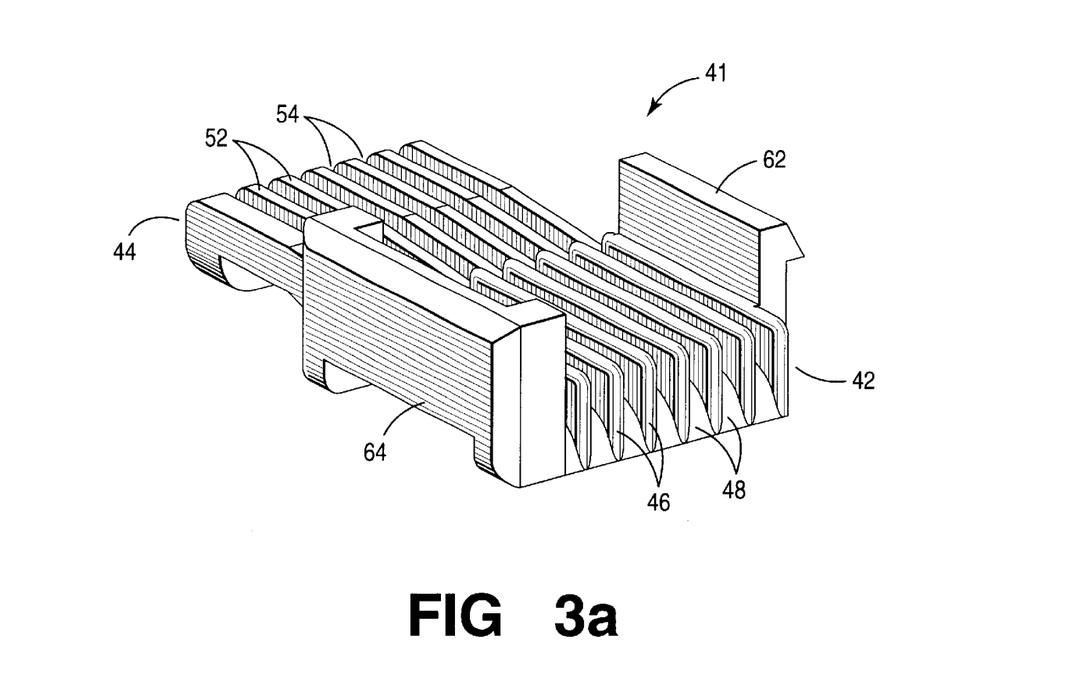
FIG. 3a is a front perspective view of one piece of a two-piece transition assembly portion of the optical fiber uniform spacing assembly according to an embodiment of the invention.
Figure 3B:
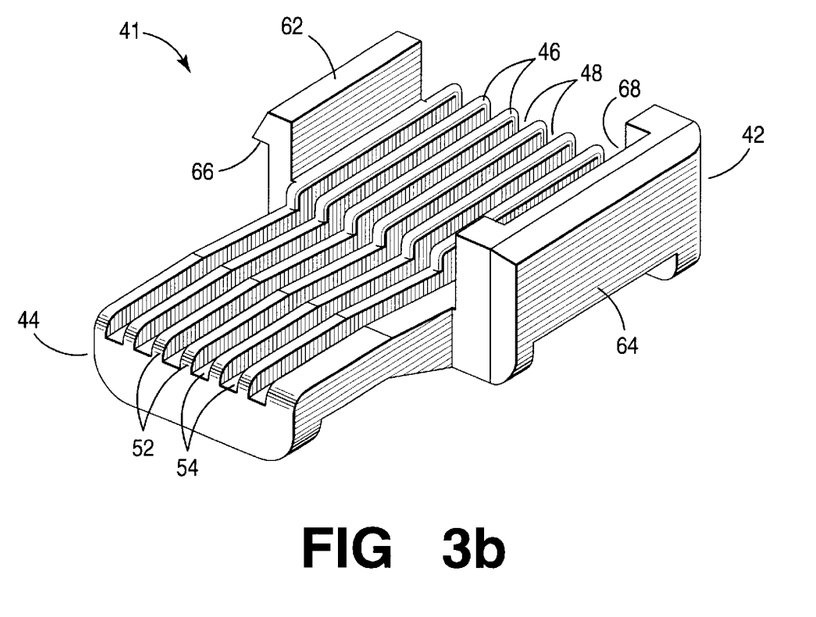

Referring now to FIGS. 3a–b, shown are views from the front (FIG. 3a) and back (FIG. 3b) of one piece or housing member 41 of a two-piece housing member embodiment of the transition assembly 18. The housing member 41 is intermatable with a similar piece to form the transition assembly 18. The housing member 41 has an input or fan-out end 42 for receiving multipitch optical fibers and an output or fan-in end 44 for further aligning those optical fibers.

Formed at the input end 42 of the housing member 41 are a plurality of fan-out fins 46 (e.g., 7 fan-out fins are shown in FIGS. 3a–b) forming a corresponding plurality of fan-out grooves 48 therebetween (e.g., 6 fan-out grooves are shown in FIGS. 3a–b). The fan-out fins 46 are spaced accordingly to define corresponding grooves dimensioned to receive one or more optical fibers from a plurality of multipitch optical fibers.

Typically, for fan-out applications, the fan-out grooves 48 are dimensioned to receive a single, jacketed optical fiber cable. However, in applications where the optical fibers or other waveguides at the fan-out end are multiple fiber segments of optical ribbon cable, e.g., a 2, 4 or 6-fiber segment of a 12-fiber ribbon cable, the fan-out grooves 48 as defined by the fan-out fins 46 are dimensioned accordingly to receive the multiple fiber segments. In a typical arrangement, e.g., such as the arrangement shown in FIGS. 3a–b, the fan-out grooves 48 are dimensioned to receive an individual coated optical fiber along with its protective jacket and strength member. Also, although the fan-out grooves 48 are shown as being generally U-shaped, it is within the scope of embodiments of the invention for the fan-out grooves to be any shape suitable for positioning one or more multipitch optical fibers therein (e.g., V-shaped or semicircular).

Formed at the fan-in or output end 44 is a corresponding array of fan-in grooves 54 (e.g., 6 fan-in grooves are shown in FIGS. 3a–b) defined by a plurality of fan-in fins 52 (e.g., 7 fan-in fins are shown in FIGS. 3a–b). The fan-in grooves 54 typically are dimensioned to position a single jacketed optical fiber. Also, similar to the fan-out grooves 48, the fan-in grooves 54 are shown as being generally U-shaped, yet it is within the scope of embodiments of the invention for the fan-in grooves 54 to be any shape suitable for positioning one or more optical fibers therein (e.g., V-shaped or semicircular).

Figure 4:
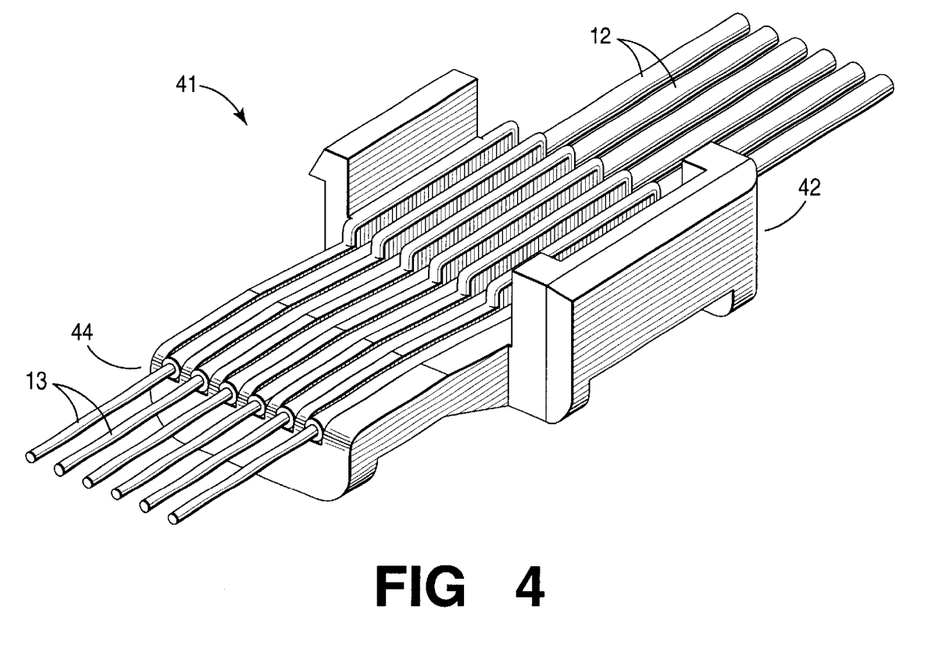
FIG. 4 is a perspective view of the two-piece transition assembly portion shown in FIGS. 3a–b with a plurality of optical fibers positioned therein.

Referring now to FIG. 4, with continuing reference to FIGS. 3a–b, a front perspective view of the transition assembly housing member 41 is shown with a plurality of optical fibers 12 operably positioned therein. According to an embodiment of the invention, the fan-out and fan-in grooves are dimensioned to receive jacketed optical fibers. However, as discussed hereinabove, the fins define grooves that are dimensioned depending on the particular application, as should be apparent to one skilled in the art.

It should be noted that the optical fibers, upon exiting the fan-in grooves, are shown stripped of their outer strengthening jackets (the fibers are shown generally as 13).

Typically, the organizer 16 receives and aligns a plurality of polymer coated optical fibers, although it is within the scope of embodiments of the invention for the plurality of optical fibers to be jacketed upon entering the organizer 16.

The grooves 48, 54 in the housing member 41 are configured such that optical fibers positioned therein generally form, e.g., a linear array. As shown in this embodiment, the fan-out grooves 48 are configured in such a way that a 1×6 array of optical fibers is formed when positioning the optical fibers in the fan-out grooves 48.

Similarly, the fan-in grooves 54 are configured to maintain the existing arrangement, e.g., the 1×6 linear array. However, at this point in what will ultimately be the transition assembly 18, the housing member 41 is more concerned with providing strain relief to the optical fibers rather than accurately aligning them.

The housing member 41 includes components or features necessary for intermating with another similarly-configured housing member to form the transition assembly 18. For example, according to an embodiment of the invention, the housing member 41 includes a first, male sidewall 62 and a second, female sidewall 64. The male sidewall 62 has, e.g., a truncated lip 66 or other feature configured to connectably engage an opening 68 or other feature formed in or part of the second, female sidewall 64.

Figure 5A:
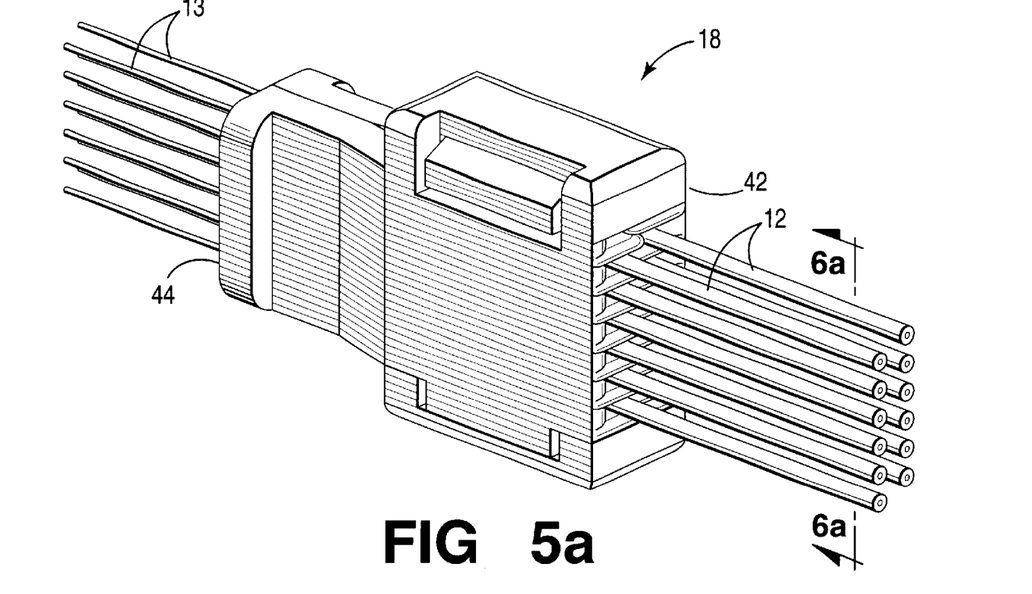
FIG. 5a is a front perspective view of a transition assembly portion of the optical fiber uniform spacing assembly according to an embodiment of the invention with a plurality of optical fibers positioned therein.
Figure 5B:
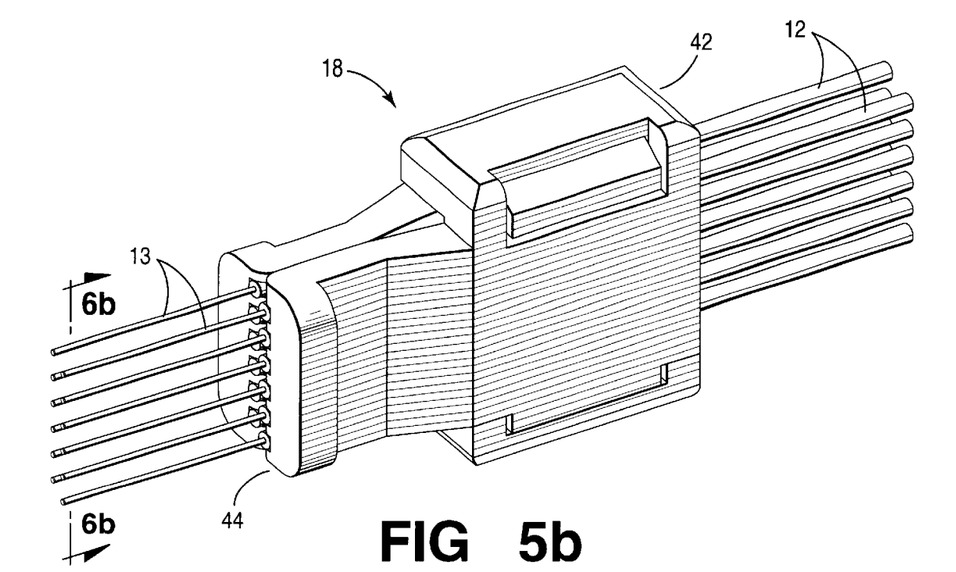

Referring now to FIGS. 5a–b, shown are front and back perspective views of the transition assembly 18, e.g., when formed by intermating two housing members of a two-piece transition assembly. The transition assembly 18 is shown generally from the front or fan-out end 42 (FIG. 5a) and from the back or fan-in end 44 (FIG. 5b). When intermated, the transition assembly housing members 41 bring together one plurality of optical fibers from the first housing member and another plurality of optical fibers from the housing member intermated therewith. Thus, for the housing members 41 shown in FIGS. 3a–b and FIG. 4, the two pluralities of optical fibers exist generally as a 2×6 array of optical fibers.

According to embodiments of the invention, the transition assembly housing members are configured in such a way that, when intermated to form the transition assembly 18, the fan-out grooves of the housing members are shifted slightly with respect to one another. In this manner, the 2×6 array of optical fibers formed when intermating the housing members is slightly staggered. Such is seen, e.g., in FIG. 6a, which shows a cross-sectional view of the transition assembly 18 taken along the lines 6a—6a of FIG. 5a, i.e., just before the fan-out end 42. Also, the staggered 2×6 array is seen in FIG. 6b, which shows a cross-sectional view of the transition assembly 18 taken along the lines 6b—6b of FIG. 5b, i.e., just beyond the fan-in end 44 of the transition assembly 18.

Figure 6A:
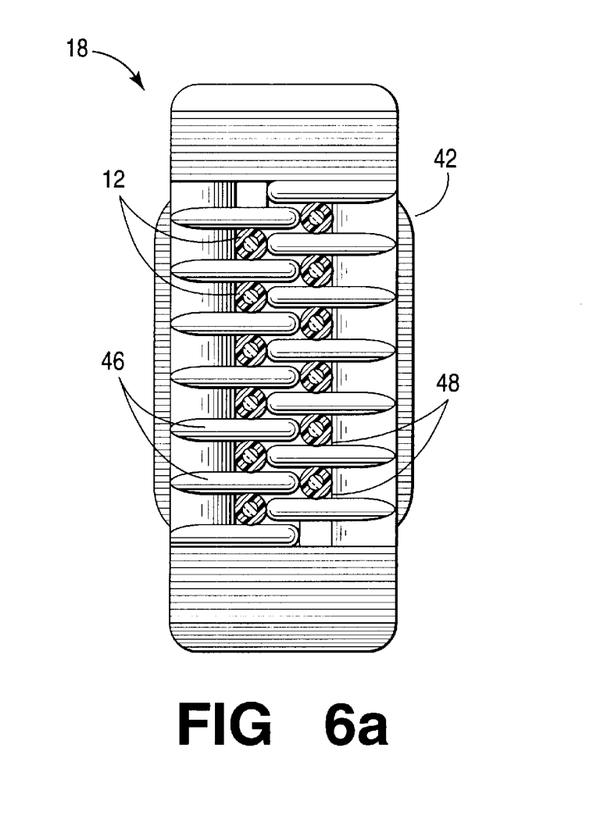
Figure 6B:
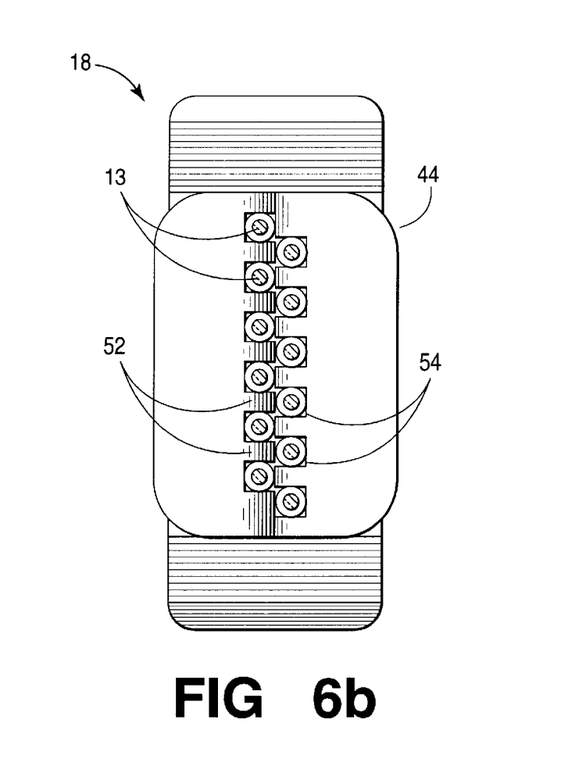
FIG. 6b is a cross-sectional view of the transition assembly taken along the lines 6b—6b of FIG. 5b.

The staggered arrangement is such that fan-out fins 46 from one housing member correspondingly align with fan-out grooves 48 of the opposing, intermated housing member, e.g., as shown in FIG. 6a. In this manner, the fan-out fins 46 assist the fan-out grooves 48 in providing strain relief for the optical fibers positioned in the fan-out grooves 48 by engaging the particular optical fiber positioned in the fan-out groove opposite the particular fan-out fin. A similar arrangement exists between fan-in fins 52 and fan-in grooves 54 at the back or fan-in end 44 of the transition assembly 18, e.g., as shown in FIG. 6b.

Figure 7A:
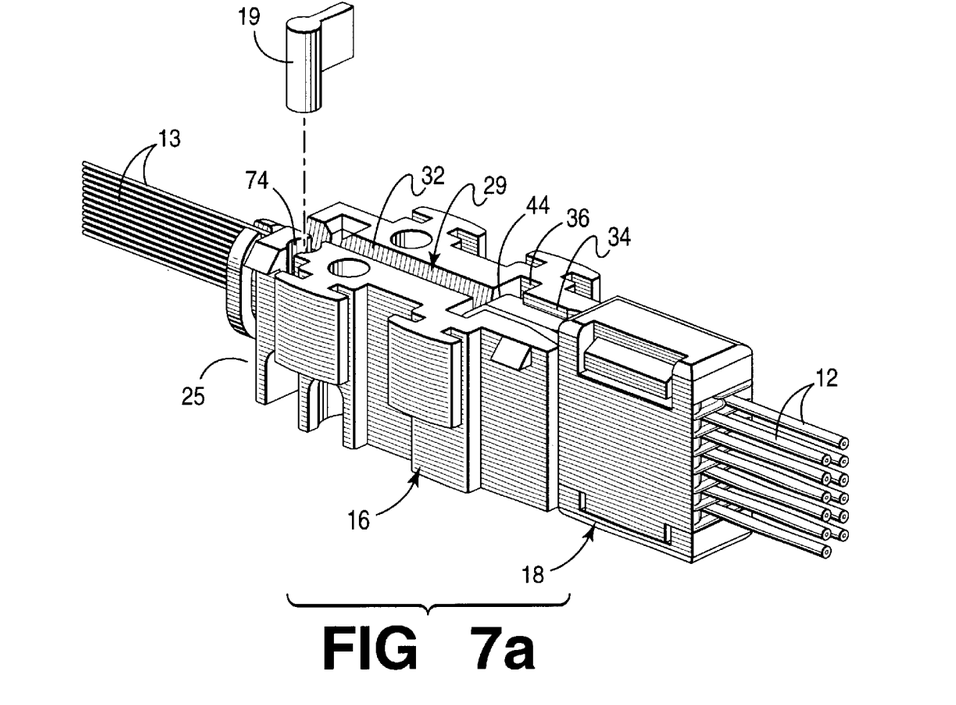
FIG. 7a is a perspective view of the optical fiber uniform spacing assembly according to an embodiment of the invention showing the transition assembly coupled to the primary assembly body and the holddown removed from the primary assembly body.
Figure 7B:
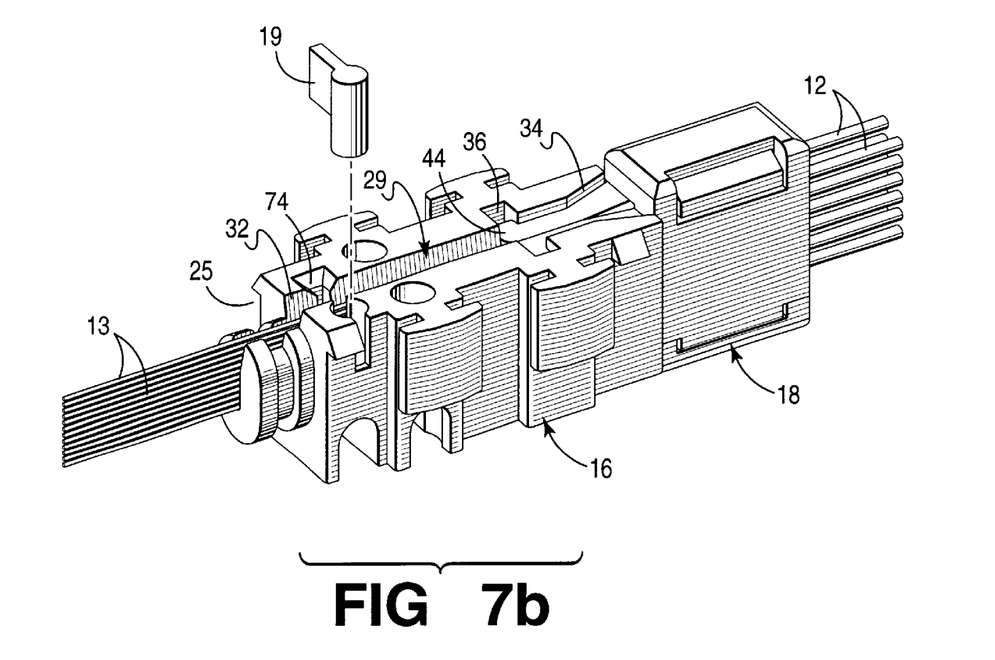
FIG. 7b is another perspective view of the optical fiber uniform spacing assembly shown in FIG. 7a showing the transition assembly coupled to the primary assembly body and the holddown removed from the primary assembly body.

Referring now to FIGS. 7a–b and 8a–b, once the transition assembly 18 is formed and the optical fibers are operably positioned therein, the transition assembly 18 is coupled to the organizer 16, e.g., by inserting a portion of the fan-in end 44 of the transition assembly 18 into a portion of the second portion 34 of the slot 29 formed in the organizer 16. As discussed previously herein, the slot 29 has features such as the pair of flanged indentations 36 formed therein and dimensioned to receive a portion of the transition assembly 18. When the transition assembly 18 is coupled to the organizer 16, e.g., as shown in FIGS. 7a–b, the portion of the plurality of optical fibers extending out of the fan-in end 44 of the transition assembly 18 fit within the first portion 32 of the slot 29 and extend out of the back end 25 of the organizer 16.

According to alternative embodiments of the invention, additional flange indentations are formed in various axial locations along the slot 29 to allow coupling of the transition assembly 18 at various axial locations along the organizer 16. Such embodiment is useful, e.g., if extra fiber length is desired, e.g., for re-working the connectorized end of the optical fibers (i.e., re-connectorization).

According to embodiments of the invention, the slot 29 is configured in such a way as to interleavingly merge the generally staggered array of optical fibers extending out the fan-in end 44 of the transition assembly 18 into a linear array. For example, the slot 29 of the organizer 16 interleavingly merges the 2×6 array of optical fibers formed by the transition assembly 18 into a 1×12 array. Depending on the coupling arrangement of the back end 25 of the organizer 16, the optical fibers in the 1×12 array either extend out of the slot 29 at the back end 25 of the organizer 16 (e.g., as shown in FIGS. 7a–b) or, e.g., are terminated near the back end 25 of the organizer 16 and polished down to the surface of the back end 25.

For example, if a multifiber optical connector or other suitable optical device is to be coupled directly to the back end 25 of the organizer 16, the plurality of fibers aligned in the slot 29 often will be cleaved and polished to the surface of the back end 25 of the organizer 16. Otherwise, the plurality of optical fibers extend out the slot 29 at the back end 25, e.g., as shown in FIGS. 7a–b. The extending optical fibers are similar in configuration to a ribbon fiber arrangement due to their relatively close spacing with respect to one another.

Figure 8A:
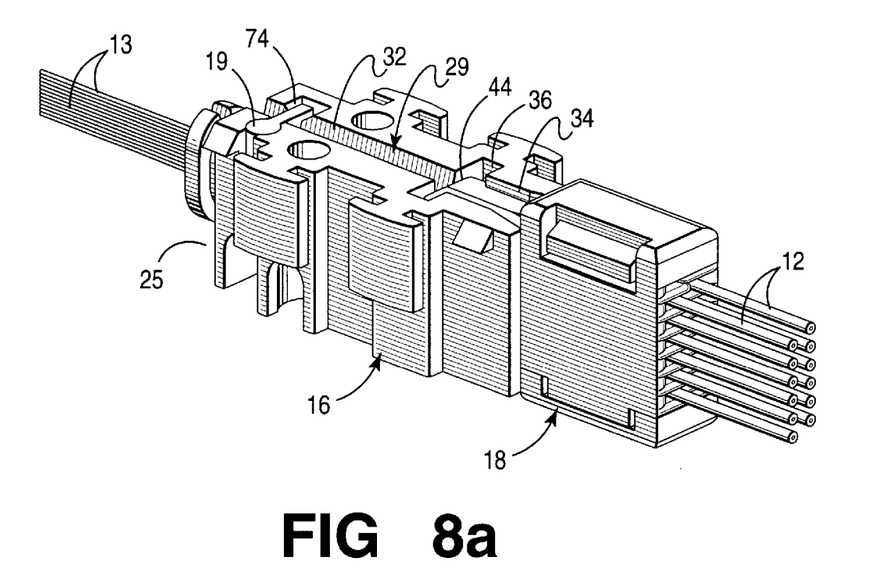
FIG. 8a is a perspective view of the optical fiber uniform spacing assembly according to an embodiment of the invention showing the transition assembly coupled to the primary assembly body and the holddown positioned in the primary assembly body.
Figure 8B:
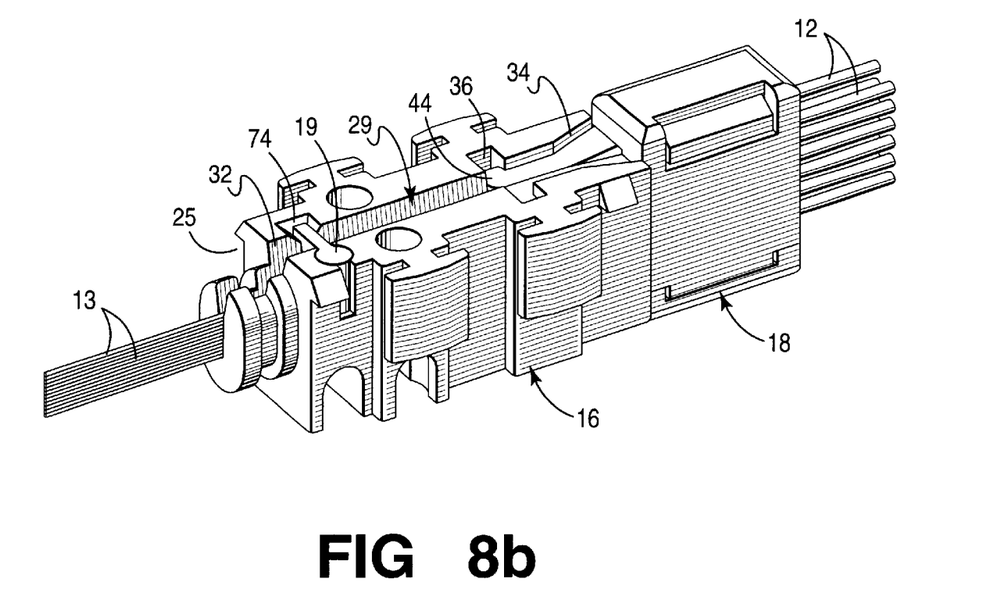
FIG. 8b is another perspective view of the optical fiber uniform spacing assembly shown in FIG. 8a showing the transition assembly coupled to the primary assembly body and the holddown positioned in the primary assembly body.

A holddown 19 fits into a holddown feature or indentation 74 formed in the first portion 32 of the slot 29, e.g., near the back end 25 of the organizer 16. FIGS. 7a–b show the assembly 10 with the holddown 19 removed from the first portion 32 of the slot 29. FIGS. 8a–b show the assembly 10 with the holddown 19 operably positioned in the holddown feature 74. The holddown 19 is configured to assist in aligning the plurality of optical fibers along with the configuration of the first portion 32 of the slot 29. As discussed previously herein, the first portion of the slot 29 is just wide enough to allow passage of a single optical fiber and is just deep enough to fit a uniform linear array of optical fibers.

The holddown 19, along with the first portion 32 of the slot 29, transitions the linear array of fibers into a uniform pitch linear array of optical fibers. More specifically, the dimensions of the holddown 19 and its operable position within the first portion 32 of the slot 29 define an area that urges the linear array of optical fibers to have relatively uniform spacing therebetween.

Figure 9A:
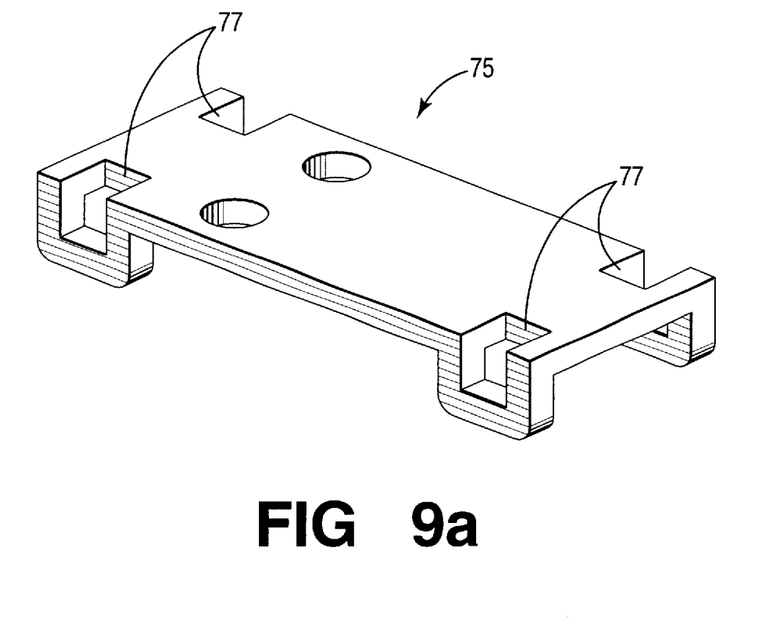
FIG. 9a is a perspective view of a cover for use in maintaining the operable position of the holddown in the primary assembly body.
Figure 9B:
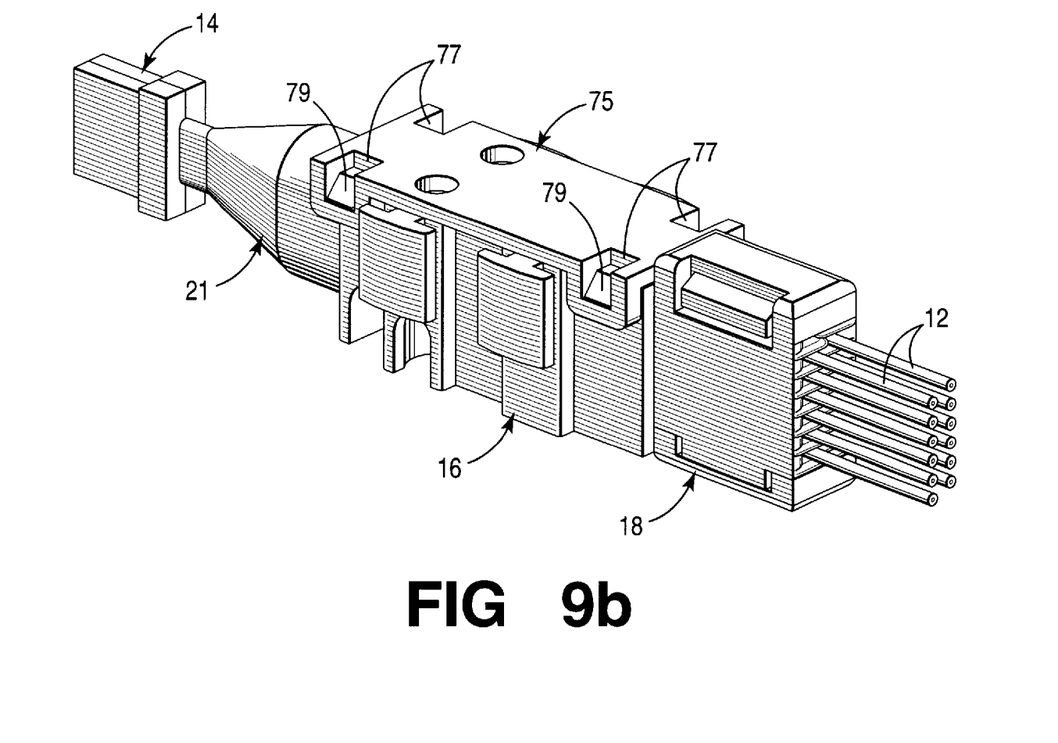
FIG. 9b is a perspective view of the optical fiber uniform spacing assembly according to an embodiment of the invention showing the cover of FIG. 9a operably positioned on the primary assembly body.

For example, in the arrangement shown in the Figures, the first portion 32 of the slot 29 has a width of approximately 250 μm (i.e., the diameter of a polymer coated optical fiber) and a final depth of approximately 3 mm (i.e., 12 fibers×250 μm per fiber). The holddown 19 is dimensioned to fit relatively snug in the holddown feature 74, thus maintaining its position therein. Alternatively, a cover or other suitable device keeps the holddown 19 in place within the holddown feature 74. For example, referring now to FIGS. 9a–b, a cover 75 is configured to fit securely on the top surface 27 of the organizer 16 where the holddown 19 fits into the holddown feature 74. A suitable fastening device or other feature or set of features is useful in keeping the cover in place over the holddown 19. For example, the cover 75 has formed therein a plurality of openings 77 configured to connectable engage a corresponding plurality of truncated lips 79 formed on the organizer 16.

Figure 10A:
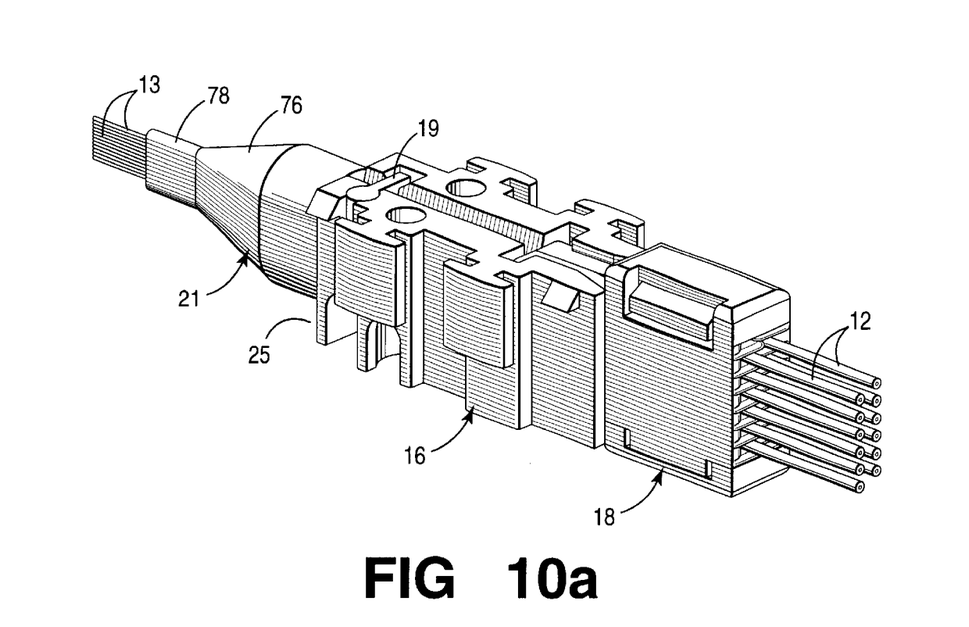
FIG. 10a is a perspective view of the optical fiber uniform spacing assembly according to an embodiment of the invention with a tapered tube operably coupled to the back end thereof.
Figure 10B:
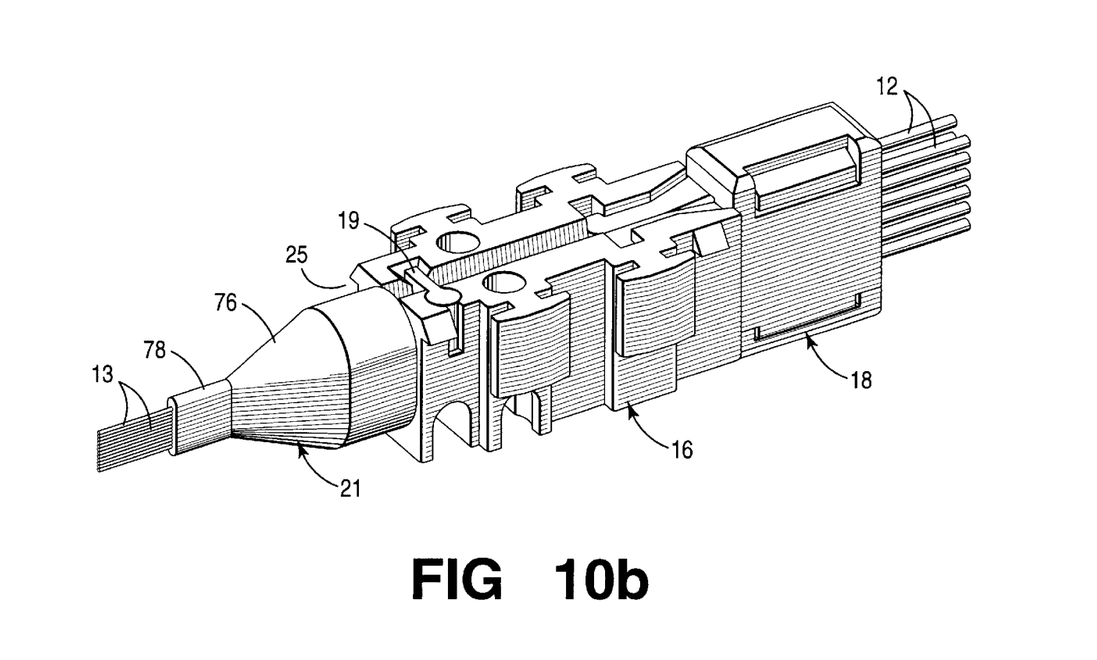
FIG. 10b is another perspective view of the optical fiber uniform spacing assembly shown in FIG. 10a with a tapered tube operably coupled to the back end thereof.

Referring now to FIGS. 10a–b, the coupling tube 21 or other suitable device is coupled to the back end 25 of the organizer 16. For example, the coupling tube 21 has a tapered portion 76 positioned over the portion of the linear array of optical fibers 13 extending from the back end 25 of the organizer 16 and a linear array portion 78 for maintaining the linear array of optical fibers 13 extending from the back end 25 of the organizer 16. The tapered portion 76 of the coupling tube 21 is coupled to the back end 25 of the organizer 16, e.g., in a suitable manner. The linear array portion 78 of the coupling tube 21 further couples the organizer 16 to a second optical device, e.g., a ribbonized connector or other suitable multifiber connector, such as the multifiber connector 14 shown in FIGS. 1a–b. Suitable connectors include, e.g., MT connectors, MAC connectors, LMC connectors or other suitable multifiber optical connectors. Such connectors are discussed, e.g., in U.S. Pat. No. 5,388,174 and U.S. Pat. No. 5,603,870.

Figure 11:
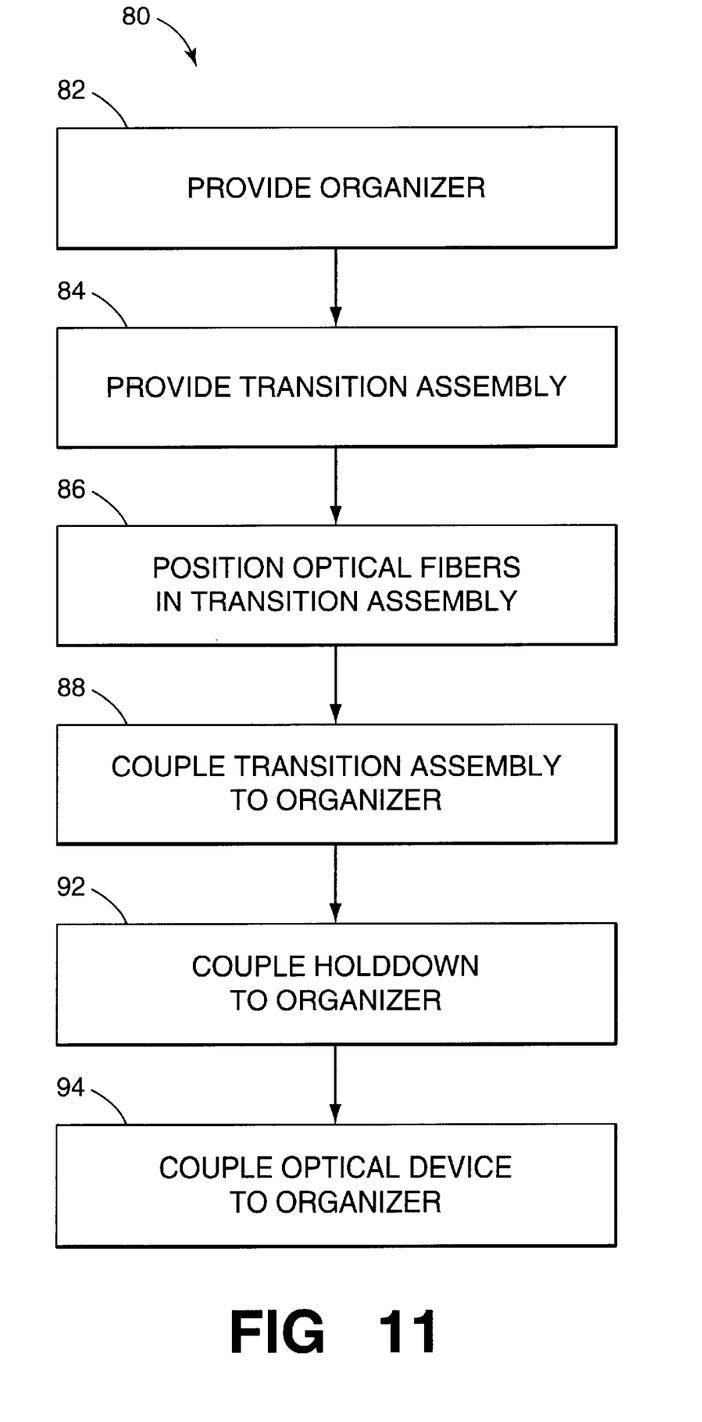
FIG. 11 is a simplified block diagram of a method for assembling a multipitch plurality of optical fibers into a uniform linear array of optical fibers.

Referring now to FIG. 11, a method 80 for assembling a multipitch plurality of optical fibers into a uniform linear array of optical fibers is shown. The method 80 includes a first step 82 of providing the organizer 16. As discussed previously herein, the organizer 16 has a slot 29 with a width slightly larger than the diameter of an optical fiber and a depth slightly larger than the width of a uniform linear array of optical fibers. Thus, the slot 29 is dimensioned to organize optical fibers positioned therein into a linear array of optical fibers.

The method includes another step 84 of providing the transition assembly 18. The transition assembly 18 is one-piece or two-piece assembly configured for providing strain relief to a multipitch plurality of optical fibers positioned therein. Although the transition assembly 18 generally is shown and discussed herein as a two-piece assembly, it is within the scope of embodiments of the invention for the transition assembly 18 to be a one-piece assembly.

The next step 86 of the method 80 is to position a plurality of optical fibers in the transition assembly 18. For a one-piece transition assembly, the optical fibers are inserted or otherwise positioned in the transition assembly. For a two-piece transition assembly 18, the step 86 includes initially positioning optical fibers in the fan-out grooves 48 defined by the fan-out fins 46 at the fan-out 42 of the housing members 41 (e.g., as shown in FIG. 4). Once the optical fibers are positioned in the grooves of the housing members 41, for a two-piece transition assembly 18, the transition assembly housing members 41 are coupled together to form the transition assembly 18 with the optical fibers positioned therein, e.g., as shown in FIGS. 5a–b.

Typically, the portion of the optical fiber to be positioned in the transition assembly 18 is jacketed and the portion of the optical fiber that extends beyond the fan-in end 44 of the transition assembly 18 is stripped of its jacket. However, as discussed previously herein, the grooves 48, 54 in the transition assembly 18 are dimensioned accordingly to the dimensions of the one or more optical fibers to be positioned therein. Thus, it is within the scope of embodiments of the invention to position optical fibers having strength members in grooves dimensioned accordingly.

The next step 88 in the method 80 is to couple the transition assembly 18 to the organizer 16. For example, the fan-in end 44 of the transition assembly 18 is configured to fit into a portion of the slot 29 in the front end 23 of the organizer 16. Alternative coupling arrangements also are possible, as discussed hereinabove. The coupling step 88 positions the array of optical fibers positioned in and extending from the transition assembly 18 into the slot 29 of the organizer 16. As discussed previously herein, a portion of the slot 29 is dimensioned to align the array of optical fibers into a linear array of optical fibers.

The next step 92 is to couple the holddown 19 to the organizer 16, e.g., as discussed hereinabove in connection with FIGS. 7a–b and FIGS. 8a–b. According to embodiments of the invention, the holddown 19 is configured and dimensioned to fit into a portion of the slot 29 of the organizer 16 where the linear array of optical fibers are positioned. When operably positioned in the organizer 16, the holddown 19 works with the slot 29 to establish a uniform spacing between adjacent optical fibers in the linear array of optical fibers positioned in the slot 29. The result is a uniform pitch, linear of array of fibers at the back end 25 of the organizer 16.

Alternatively, an additional step 94 is to couple a multifiber connector 14 or other suitable optical device to the organizer 16, e.g., at the back end 25 thereof. For example, a multifiber connector such as a MT connector, LMC connector or MAC connector is coupled to the organizer 16, e.g., as shown in FIGS. 1a–b. In such arrangements, the coupling tube 21 is used to facilitate coupling the uniform pitch linear array of optical fibers extending from the back end 25 of the organizer 16 to the multifiber connector 14. As discussed previously herein, other suitable coupling arrangements are within the scope of embodiments of the invention.

It will be apparent to those skilled in the art that many changes and substitutions can be made to the embodiments of the assembly apparatus and methods herein described without departing from the spirit and scope of the invention as defined by the appended claims and their full scope of equivalents.

What is claimed is:

1. An optical uniform spacing assembly, comprising:
   an organizer body having a slot formed therein and extending longitudinally along the body, at least a portion of the slot having a width dimensioned to allow no more than one optical fiber therethrough simultaneously and at least a portion of the slot having a depth dimensioned to align a multipitch plurality of optical fibers into a uniform pitch linear array of optical fibers; and
   a holddown dimensioned to fit into at least a portion of the slot and configured to partially dimension at least a portion of the depth of at least a portion of the slot.

2. The apparatus as recited in claim 1, wherein the organizer body includes a front end and a back end, and wherein the front end is a fan-out end adapted for receiving a multipitch plurality of optical fibers.

3. The apparatus as recited in claim 1, wherein the organizer body includes a front end and a back end, and wherein the back end is a fan-in end adapted for coupling with a multifiber connector.

4. The apparatus as recited in claim 3, wherein the multifiber connector is selected from the group consisting of MT connector, LMC connector and MAC connector.

5. The apparatus as recited in claim 1, wherein the organizer body has a front end and a back end, wherein the slot extends longitudinally from the front end to the back end and aligns the plurality of optical fibers at the back end into a ribbon cable arrangement.

6. The apparatus as recited in claim 1, further comprising a transition assembly configured for operably coupling to the organizer body of the optical uniform spacing assembly, wherein the transition assembly is configured for positioning a plurality of individual optical fibers into an array of multipitch optical fibers, and wherein the transition assembly is configured for providing strain relief to the plurality of optical fibers positioned therein.

7. The apparatus as recited in claim 6, wherein a portion of the slot is dimensioned to couple the transition assembly thereto.

8. The apparatus as recited in claim 7, wherein the transition assembly further comprises:
   a first housing member having an input end and an output end; and
   a second housing member having an input end and an output end and intermatable with the first housing member,
   wherein the input end of the first housing member includes a first plurality of fins defining a first plurality of grooves dimensioned to receive a first plurality of multipitch optical fibers and the input end of the second housing includes a second plurality of fins defining a second plurality of grooves dimensioned to receive a second plurality of multipitch optical fibers,
   wherein the output end of the first housing member includes a third plurality of fins defining a third plurality of grooves dimensioned to receive the first plurality of multipitch optical fibers from the first plurality of grooves and the output end of the second housing member includes a fourth plurality of fins defining a fourth plurality of grooves dimensioned to receive the second plurality of multipitch optical fibers from the second plurality o f grooves,
   wherein, the first and second housing members are configured in such a way that, when the first and second housing members are intermated, fins from the first plurality of fins align between fins from the second plurality of fins in such a way that optical fibers positioned in the second plurality of grooves are maintained by the fins from the first plurality of fins and fins from the second plurality of fins align between fins from the first plurality of fins in such a way that optical fibers positioned in the first plurality of grooves are maintained by the fins from the second plurality of fins, and
   wherein, the first and second housing members are configured in such a way that, when the first and second housing members are intermated, fins from the third plurality of fins align between fins from the fourth plurality of fins in such a way that optical fibers positioned in the fourth plurality of grooves are maintained by the fins from the third plurality of fins and fins from the fourth plurality of fins align between fins from the third plurality of fins in such a way that optical fibers positioned in the third plurality of grooves are maintained by the fins from the fourth plurality of fins.

9. The apparatus as recited in claim 1, wherein the slot aligns the plurality of optical fibers into a linear array of optical fibers having a uniform pitch of approximately 250 microns ($\mu$m) center-to-center.

10. A method for assembling a multipitch plurality of optical fibers into a uniform pitch plurality of optical fibers, the method comprising the steps of:
   providing an organizing assembly having a slot dimensioned to radially pass no more than one optical fiber therethrough and to align a multipitch plurality of optical fibers into a uniform pitch linear array of optical fibers;
   providing a transition assembly configured for coupling to the organizing assembly and for positioning a plurality of individual optical fibers into an array of optical fibers, the transition assembly including a plurality of grooves dimensioned to receive a plurality of multipitch optical fibers therein;
   positioning a multipitch plurality of optical fibers in the transition assembly in such a way that a portion of the multipitch plurality of optical fibers is positioned in the transition assembly and a portion of the multipitch plurality of optical fibers extends from the transition assembly, wherein the transition assembly provides strain relief to the portion of the optical fibers positioned therein;
   coupling the transition assembly to the organizing assembly, wherein the portion of the multipitch plurality of optical fibers extending from the transition assembly is aligned in the slot of the organizing assembly in such a way that a uniformly pitched linear array of optical fibers is formed; and
   coupling a holddown to the organizing assembly to partially dimension at least a portion of the slot.

11. The method as recited in claim 10, further comprising the step of coupling a multifiber connector to the organizing assembly.

12. The method as recited in claim 11, wherein the multifiber connector coupling step further comprises coupling a multifiber connector selected the group consisting of MT connector, LMC connector and MAC connector to the organizing assembly.

13. The method as recited in claim 10, wherein the organizing assembly has a plurality of coupling position features and the coupling step further comprises coupling the transition subassembly to one of the plurality of coupling positions formed along the organizing assembly.

14. The method as recited in claim 10, wherein the plurality of optical fibers include a coating layer formed thereon and a protective strength layer formed on the coating layer, and wherein the portion of the plurality of optical fibers positioned within the transition assembly comprises coated optical fibers stripped of their protective strength layers, and wherein the portion of the plurality of optical fibers positioned and aligned within the organizing assembly comprises uncoated optical fibers stripped of their protective strength layer and their coating.

15. An optical waveguide system for transmitting optical energy, comprising:
   a first optical device, including a multipitch plurality of optical waveguides;
   a second optical device having a uniform pitch linear array of optical waveguides;
   an optical uniform spacing assembly coupled therebetween,
   wherein the uniform spacing assembly includes a body having a slot formed therein and extending longitudinally along the body, at least a portion of the slot having a width dimensioned to radially pass no more than one optical fiber therethrough and at least a portion of the slot having a depth dimensioned to align the multipitch plurality of optical fibers into a uniform pitch linear array of optical fibers configured for optically coupling to the second optical device; and
   a holddown dimensioned to fit into at least a portion of the slot and configured to partially dimension at least a portion of the depth of at least a portion of the slot.

16. The system method as recited in claim 15, wherein the body includes a front, fan-out end adapted for receiving a multipitch plurality of optical fibers, and a back, fan-in (ribbonized) end adapted for coupling with the second optical device.

17. The system method as recited in claim 15, wherein the second optical device is a multifiber connector.

18. The system method as recited in claim 17, wherein the multifiber connector is selected from the group consisting of MT connector, LMC connector and MAC connector.

19. The system method as recited in claim 15, further comprising a transition assembly configured for operably coupling to the body of the optical fiber uniform spacing assembly, wherein the transition assembly is configured for transitioning a plurality of individual optical fibers into an array of multipitch optical fibers, and wherein the transition assembly is configured for providing strain relief to the plurality of optical fibers positioned therein.

20. The system method as recited in claim 15, wherein the body has a front end and a back end, wherein the slot extends longitudinally from the front end to the back end and aligns the plurality of optical fibers at the back end into a ribbon cable arrangement.

21. The system method as recited in claim 15, wherein the slot aligns the plurality of optical fibers into a linear array of optical fibers having a uniform pitch of approximately 250 microns ($\mu$m) center-to-center.

\* \* \* \* \*